Patented Feb. 18, 1936

2,031,228

UNITED STATES PATENT OFFICE 2,031,228

PROCESS FOR THE PRODUCTION OF ALKYL HALIDES

John H. Reilly, Midland, Mich., assignor to The Dow Chemical Company, Midland, Mich., a corporation of Michigan No Drawing. Application May 1, 1935,
Serial No. 19,193

8 Claims. (Cl. 260—162)

The present invention relates to methods for the preparation of alkyl halides by the direct addition of hydrogen halides to olefines; particularly to methods for the preparation of alkyl chlorides from olefines and hydrogen chloride; and, more particularly, to methods for the preparation of ethyl chloride by combining ethylene and hydrogen chloride. The term "alkyl halides" as herein used means alkyl halides which have at least two carbon atoms in the molecule.

The preparation of ethyl chloride by combining ethylene with hydrogen chloride in the presence of catalytic agents, such as aluminum chloride, ferric chloride, antimony chloride, and bismuth chloride, under certain conditions, has been described in the patented art. United States Patent Number 1,518,182 to Curme discloses the preparation of ethyl chloride by the reaction of hydrogen chloride and ethylene under superatmospheric pressures, particularly in the presence of aluminum chloride. United States Patent Number 1,560,625 to Webb discloses a process of combining olefines and hydrogen chloride in the presence of aluminum chloride in a series of steps without the use of pressure. The preparation of ethyl chloride by combining ethylene and dry hydrochloric acid gas with the aid of catalysts, particularly aluminum chloride or ferric chloride, at superatmospheric pressures, and temperatures not exceeding 10° C., is described in United States Patent 1,637,972 to Suida. United States Patent Number 1,591,151 to Wibaut discloses a vapor-phase process for making alkyl halides from olefines and hydrogen halides by conducting the same over a compound of a metal of the fifth group of the periodic system at a temperature between about 100° and about 250° C.

Addition reactions of the type here in question, wherein inorganic metal compounds are employed as catalytic agents to facilitate the combination of two chemicals, are ordinarily subject to the disadvantage that the catalyst is poisoned after a relatively small amount of product has been obtained per pound of catalyst. The procedure described in the Curme patent is disadvantageous because it is a batch process requiring high pressures, and because the yield of ethyl chloride obtained per unit weight of aluminum chloride used is relatively low. In the Curme procedure where no catalyst is used, the pressures required to effectuate the reaction are extremely high, ranging, as pointed out in the patent, up to 160 atmospheres or 2200 pounds per square inch. The Webb process produces a relatively low yield of alkyl chloride per unit weight of aluminum chloride before the catalyst is poisoned under the conditions given in the patent. The Suida procedure is also a batch process, and calls for the cooling of the reaction chamber wherein the ethyl chloride is produced. The Wibaut procedure calls for high temperatures, and the catalyst is quickly poisoned under the conditions given. None of the foregoing procedures can be employed with success where the supply of olefine gas is contaminated with inert gases such as methane, hydrogen, carbon dioxide, ethane, etc., as is the gas obtained by the pyrolysis of petroleum.

The preparation of ethyl chloride in low yields by the decomposition of ethyl chlorosulphonate with water is disclosed in the chemical literature. An improvement on this method has been patented to Traube in United States Patent 1,470,656. This improvement resides in the use of aqueous hydrochloric acid as the decomposing agent, whereby ethyl chloride is obtained in good yields, sulphuric acid being produced as a by-product. This last procedure is disadvantageous in that it is a two-stage batch process requiring the production of ethyl chlorosulphonate by the treatment of chlorosulphonic acid with ethylene, and that, in the subsequent decomposition of the same, sulphuric acid is produced.

I have now developed a continuous process for combining olefines and hydrogen halides by passing substantially equimolecular proportions of the same through a liquid medium comprising an alkyl chlorosulphonate, under anhydrous conditions, at approximately atmospheric pressure. The alkyl chlorosulphonate does not take part in the reaction, therefore I do not require chlorosulphonic acid as a raw material in my process, and the production of sulphuric acid as a by-product is avoided. I have determined that olefine gas containing as much as 55 per cent by volume of inert gases can be employed in my process without disadvantage as to the yield of alkyl halide obtained, based on the amount of olefine passed into the reaction medium.

The temperature at which the liquid medium is to be maintained is preferably above the boiling point of the alkyl halide to be made, and for ethyl chloride is within the range between about 40° and about 70° C. However, while this temperature range is the most practical, it should be noted that in my medium the combining reaction proceeds at temperatures as low as 0° C. and can be carried out at 100° C. It is advantageous to operate the medium in the 40°–70° C.

range, because high yields of ethyl chloride are obtained, the ethyl chloride distills from the reaction medium as rapidly as it is formed, and because hot water can be employed as the heating agent. Preferably I employ in the reaction bath an alkyl chlorosulphonate having an alkyl group corresponding to that in the alkyl halide to be produced. The alkyl halide distilling from the reaction chamber can be collected in a receptacle cooled well below the boiling point of the alkyl halide, or may be absorbed in a liquid agent such as gas oil, or orthodichlorobenzene, and recovered therefrom by distillation.

I find that the use of relatively small amounts of bismuth compounds, particularly the halides, preferably the chloride when alkyl chlorides are to be made and the bromide when alkyl bromides are to be produced, is effective in accelerating the rate of the reaction. It is thus possible, by the use of bismuth compounds, to produce larger amounts of alkyl halide from equivalent quantities of reaction bath. Among the bismuth compounds I have employed are the sub-nitrate and sub-carbonate. I have experimented with over 40 different catalytic agents in my reaction medium to determine whether or not the speed of the reaction could be accelerated. To that end I have employed the catalysts mentioned in the patented art hereinbefore discussed, such as aluminum chloride and ferric chloride, as well as many others; however, I have determined that with the exception of the bismuth compounds such catalysts are ineffective to promote the combining reaction under my conditions.

The following example illustrates the practice of my invention in the production of ethyl chloride in an ethyl chlorosulphonate bath without the presence of a catalytic agent. A liquid reaction bath composed of 425 grams of anhydrous ethyl chlorosulphonate was maintained in a glass column, at a temperature of about 65° C. Into the bottom of this column reactor over a period of 2 hours and 40 minutes, 2.0 cubic feet of dry ethylene and 2.0 cubic feet of anhydrous hydrogen chloride were passed concurrently at a substantially uniform rate and at about atmospheric pressure. The gas leaving the top of the liquid reaction bath was collected in a receiver cooled with solid carbon dioxide, and 149.4 grams of product obtained. This was distilled to obtain 144.9 grams of pure ethyl chloride, which represents a yield of 95.3% of theory, based on the ethylene entering the reactor.

As an example illustrating the practice of my invention in the production of ethyl chloride in an ethyl chlorosulphonate bath in the presence of a catalytic agent, I have obtained the following results, using an olefiant gas obtained by the pyrolysis of petroleum distillate. The gas contained 47.5% by weight of ethylene, the balance being largely hydrogen and methane. This gas was passed into a liquid reaction bath consisting of 425 grams of ethyl chlorosulphonate having suspended therein 5 grams of bismuth chloride, at a uniform rate of 0.6 cubic foot per hour. Anhydrous hydrogen chloride gas in slightly more than equimolecular proportion, based on the ethylene content of the olefiant gas, was concurrently passed at a substantially uniform rate into the reaction bath. The bath was maintained at a temperature of approximately 60° C., and the pressure thereon was about atmospheric. The mixture of ethylene and hydrogen chloride gases was passed into the bath over a period of 50 hours, during which time the ethyl chloride produced distilled from the bath as rapidly as it was formed and was collected in a cooled receiver. By distillation of the liquid product 1011 grams of pure ethyl chloride was obtained. This represents a yield of 93.3% of theoretical, based on the amount of ethylene passed into the reaction bath. At the end of this period of time there was no apparent decrease in the catalytic activity of the bath.

In a similar manner, ethyl bromide can be made from ethylene and hydrogen bromide, using ethyl bromosulphonate as a reaction bath. Isopropyl bromide can be prepared in good yields from propylene and hydrogen bromide in a reaction bath of propyl bromosulphonate. Tertiary butyl chloride is readily made by passing isobutylene and hydrogen chloride through a liquid bath of butyl chlorosulphonate.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. In a process for the production of alkyl halides, the step which consists in passing an olefine and a hydrogen halide into an anhydrous liquid medium comprising an alkyl halosulphonate.

2. In a process for the production of alkyl halides, the step which consists in passing an olefine and a hydrogen halide into an anhydrous liquid bath of an alkyl halosulphonate containing a bismuth compound.

3. In a process for the production of ethyl chloride, the step which consists in passing ethylene and hydrogen chloride into an anhydrous liquid bath of ethyl chlorosulphonate.

4. In a process for the production of ethyl chloride, the step which consists in passing ethylene and hydrogen chloride into an anhydrous liquid bath of ethyl chlorosulphonate containing a bismuth compound.

5. In a process for the production of ethyl chloride, the step which consists in passing ethylene and hydrogen chloride into an anhydrous liquid bath of ethyl chlorosulphonate containing bismuth chloride.

6. In a process for the production of ethyl chloride, the step which consists in passing ethylene and hydrogen chloride into an anhydrous liquid bath of ethyl chlorosulphonate containing bismuth chloride and maintained at a temperature between about 40° and about 70° C.

7. In a process for the production of ethyl chloride, the step which consists in passing ethylene and hydrogen chloride into an anhydrous liquid bath of ethyl chlorosulphonate containing bismuth chloride and maintained at a temperature between about 40° and about 70° C. at approximately atmospheric pressure.

8. In a process for the production of ethyl chloride, the step which consists in passing ethylene and hydrogen chloride into an anhydrous liquid bath of ethyl chlorosulphonate containing bismuth chloride and maintained at a temperature between about 40° and about 70° C. at approximately atmospheric pressure, and collecting the ethyl chloride distilling therefrom.

JOHN H. REILLY.